(12) United States Patent
Landry et al.

(10) Patent No.: US 9,672,252 B2
(45) Date of Patent: Jun. 6, 2017

(54) IDENTIFYING AND RANKING SOLUTIONS FROM MULTIPLE DATA SOURCES

(75) Inventors: John A Landry, Spring, TX (US); Eric Gagneraud, Houston, TX (US); Miguel E Lezcano, Houston, TX (US); Cesar Augusto Rosa, Cypress, TX (US); Stephen M DeRoos, Vancouver, WA (US)

(73) Assignee: Hewlett-Packard Development Company, L.P., Houston, TX (US)

(*) Notice: Subject to any disclaimer, the term of this patent is extended or adjusted under 35 U.S.C. 154(b) by 335 days.

(21) Appl. No.: 14/371,514

(22) PCT Filed: Mar. 8, 2012

(86) PCT No.: PCT/US2012/028340
§ 371 (c)(1),
(2), (4) Date: Jul. 10, 2014

(87) PCT Pub. No.: WO2013/133843
PCT Pub. Date: Sep. 12, 2013

(65) Prior Publication Data
US 2015/0052122 A1 Feb. 19, 2015

(51) Int. Cl.
*G06F 17/30* (2006.01)
*G06F 11/07* (2006.01)

(52) U.S. Cl.
CPC ...... *G06F 17/3053* (2013.01); *G06F 11/0706* (2013.01); *G06F 11/0793* (2013.01); *G06F 17/30554* (2013.01)

(58) Field of Classification Search
CPC .................. G06F 11/0793; G06F 17/3053
See application file for complete search history.

(56) References Cited

U.S. PATENT DOCUMENTS

| 6,357,017 | B1 | 3/2002 | Bereiter et al. |
| 7,058,860 | B2 | 6/2006 | Miller et al. |
| 7,337,404 | B2 | 2/2008 | Rollins |
| 2007/0168758 | A1* | 7/2007 | Kolb ...................... G06F 9/4446 714/46 |
| 2008/0172574 | A1 | 7/2008 | Fisher |
| 2008/0294423 | A1* | 11/2008 | Castellani ........... G06F 11/0733 704/4 |
| 2010/0042560 | A1 | 2/2010 | Vukovic et al. |
| 2010/0161389 | A1* | 6/2010 | Arning ..................... G06N 5/04 705/7.11 |

(Continued)

FOREIGN PATENT DOCUMENTS

| CN | 102317937 | 1/2012 |
| DE | 102004036912 A1 | 3/2006 |

OTHER PUBLICATIONS

PCT; "Notification of Transmittal of the International Search Report and the Written Opinion of the International Searching Authority, or the Declaration"; cited in PCT/US2012/028340; mailed Nov. 23, 2012; 8 pages.

*Primary Examiner* — Grace Park
(74) *Attorney, Agent, or Firm* — HP Patent Department

(57) ABSTRACT

Information regarding a computing device can be gathered, such as device information and support information. A plurality of solutions can be identified from multiple data sources based on the gathered information. The identified solutions can be ranked based on the gathered information and based on other information.

18 Claims, 4 Drawing Sheets

(56) References Cited

U.S. PATENT DOCUMENTS

| | | |
|---|---|---|
| 2010/0262858 A1 | 10/2010 | Chen et al. |
| 2010/0333066 A1* | 12/2010 | Feniello ............. G06F 11/0748 717/120 |
| 2011/0055699 A1 | 3/2011 | Li et al. |
| 2011/0107137 A1 | 5/2011 | Lam et al. |
| 2011/0167019 A1 | 7/2011 | Madison |
| 2011/0191326 A1* | 8/2011 | Gutlapalli ............... G06F 3/048 707/723 |
| 2012/0102037 A1* | 4/2012 | Ozonat ............ G06F 17/30675 707/738 |

* cited by examiner

IDENTIFYING AND RANKING SOLUTIONS FROM MULTIPLE DATA SOURCES

CROSS-REFERENCE TO RELATED APPLICATION

This application is a national stage application under 35 U.S.C. §371 of PCT/US2012/028340, filed Mar. 8, 2012.

BACKGROUND

Users of computing devices sometimes encounter problems with their computing devices. Potential problems can range from device errors, to user errors, to simply user ignorance regarding how to perform a task. Often users attempt to use a search engine to search for a solution on the Internet or seek help from someone else, such as the device maker, a technical specialist, or a friend. Resolving the problem can be frustrating, time consuming, and expensive for the user.

BRIEF DESCRIPTION OF DRAWINGS

The following detailed description refers to the drawings, wherein.

DETAILED DESCRIPTION

Manufacturers of computing devices and providers of technical support are challenged with enabling an easier and more efficient manner of resolving problems encountered during use of a computing device. As described in detail below, various example embodiments relate to techniques of identifying potential solutions to problems from multiple data sources and ranking the solutions based on information from the user's device as well as other information. In addition, various example embodiments relate to presenting the solutions to the user in an easily understandable and accessible manner, improving the ranking of the solutions, updating the user on new solutions, and providing alternatives for accessing the solutions.

A more positive user experience may be achieved by using these techniques. For example, when a problem arises on a computing device, a user often will search across multiple sources to find solutions to the problem. These sources may include help resources on the device itself or the device manufacturer's website, help resources on the operating system website, forums, third party support sites, and the like. Many users resort to searching for a solution on the Web using a search engine. The process of searching for and finding help can be time consuming, frustrating, and ineffective. For instance, users sometimes have a hard time effectively and accurately describing the problem or issue. Solutions to problems may be found at different resources and locations than the user may expect them to be found. Furthermore, often users have to leave their current computing experience to find the solution. Additionally, the search process can be repetitive and sometimes users can forget where they found answers to a problem that has recurred. However, using the techniques described herein to provide a one-stop, intuitive support solution can alleviate many of these problems and improve user satisfaction.

Further details of these embodiments and associated advantages, as well as of other embodiments and applications, will be discussed in more detail below with reference to the drawings.

Figure 1:
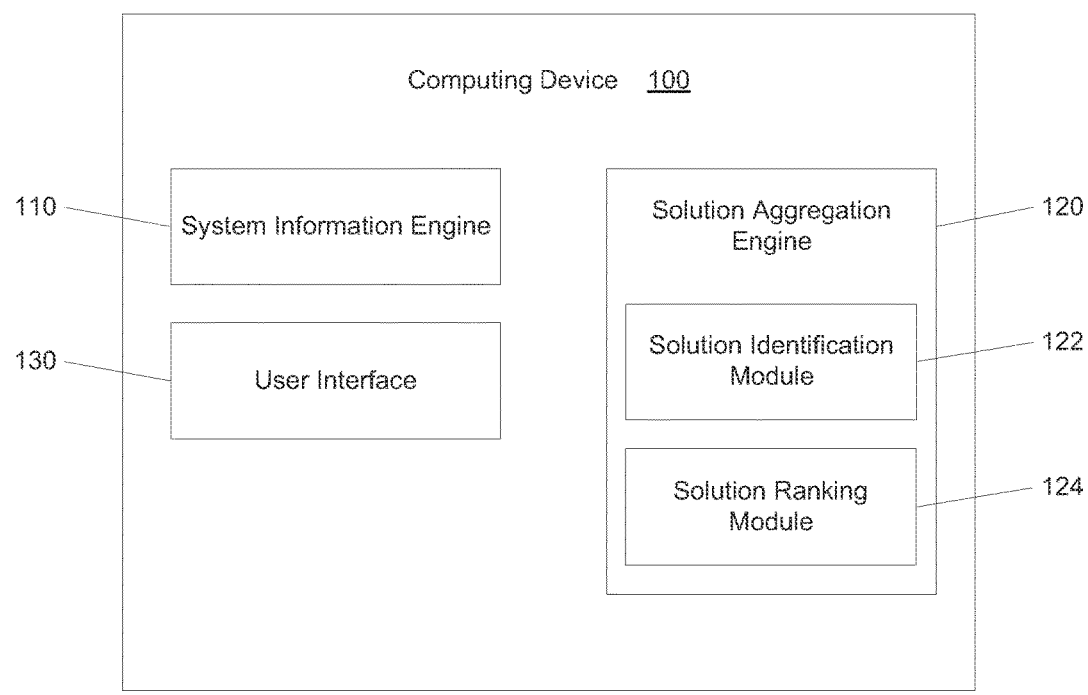
FIG. 1 is a block diagram illustrating a computing device for finding solutions to computer problems, according to an example.

Referring now to the drawings, FIG. 1 is a block diagram illustrating a computing device 100, according to an embodiment. Computing device 100 may be any of a variety of computing devices. For example, computing device 100 may be a laptop computer, a workstation computer, a desktop computer, a tablet or slate computer, or a smart phone, among others. Computing device 100 may include various components, such as a system information engine 110, a solution aggregation engine 120, and a user interface 130. In some examples, each of these components can be combined into a single software support application. In some cases, the application may be integrated with the operating system and/or may have adequate privileges for accessing various information, as described below.

Computing device 100 may include one or more controllers for implementing the system information engine 110, the solution aggregation engine 120, and the user interface 130. The controller may include one or more processors and memories for implementing these components. The processor may include a central processing unit (CPU), a semiconductor-based microprocessor, a digital signal processor (DSP) such as a digital image processing unit, other hardware devices or processing elements suitable to retrieve and execute instructions stored in memory, or combinations thereof. The processor can include single or multiple cores on a chip, multiple cores across multiple chips, multiple cores across multiple devices, or combinations thereof. The processor may fetch, decode, and execute instructions from memory to perform various functions. As an alternative or in addition to retrieving and executing instructions, the processor may include at least one integrated circuit (IC), other control logic, other electronic circuits, or combinations thereof that include a number of electronic components for performing various tasks or functions.

The controller may include one or more memories, such as a machine-readable storage medium. The machine-readable storage medium may be any electronic, magnetic, optical, or other physical storage device that contains or stores executable instructions. Thus, the machine-readable storage medium may comprise, for example, various Random Access Memory (RAM), Read Only Memory (ROM), flash memory, and combinations thereof. For example, the machine-readable medium may include a Non-Volatile Random Access Memory (NVRAM), an Electrically Erasable Programmable Read-Only Memory (EEPROM), a storage drive, a NAND flash memory, and the like. Further, the machine-readable storage medium can be computer-readable and non-transitory.

The system information engine 110 may gather various information. For example, the system information engine 110 may gather device information and support information. Device information may be basic information about the computing device 100, such as the brand and model of the computing device, an operating system running on the computing device, other software or drivers installed or running on the computing device, a registered owner of the computing device, a current user of the computing device, a primary language (e.g., English), and the like. Support information may be information regarding a potential problem or support issue for the computing device. For example, support information may include a current status of the computing device and error events associated with the computing device. This information may be obtained, for example, from system logs, application logs, and registry settings. Support information may also include contextual information such as open applications or operating system utilities being accessed by the user. In addition, support information may include information input by a user into a help query field, or the like, via user interface 120 or via some other application running on computing device 100.

The system information engine 110 may gather the various information by requesting it from the operating system and from active applications. Gathering the information may also include simply receiving periodic updates on the information from various sources on computing device 100. In some examples, the system information engine 110 may be configured to maintain records of other information that may be relevant to determining a solution to a support issue. For example, an IT administrator for a company could configure the system information engine 110 to gather specific information that may be relevant to specific support issues that tend to arise within the company. In addition, while the system information engine 110 is shown as being a part of computing device 100, in some examples the system information engine could be run on a server and could gather appropriate information from computing device 100 when appropriate to resolve support issues.

The solution aggregation engine 120 may aggregate solutions to a support issue associated with the computing device 100 based on the information gathered by the system information engine 110. The solution aggregation engine 120 may aggregate the solutions from multiple electronic data sources.

The electronic data sources may be resident on the computing device 100 or remote from computing device 100. If the sources are remote, they may be accessed directly by the computing device 100 via the solution aggregation engine 120 or they may be accessed via a server that supports the solution aggregation engine. The sources may include various support assets and information databases available from the device manufacturer, from the operating system manufacturer, and from third party support providers. The sources may also include support resources available on the Web, such as support forums. Additionally, the sources may be private sources, such as support databases or tools provided by a company to its employees. Solutions provided by the sources may be in various formats. For example, solutions may be documents, videos, audio recordings, tools, utilities, diagnostics, troubleshooters, blogs or blog posts, and forums or forum posts.

The solution aggregation engine 120 may include a solution identification module 122. The solution identification module 122 may identify a plurality of solutions based on the information gathered by the system information engine. The plurality of solutions may be identified by searching the multiple electronic data sources. In an example, each data source can have one or more indexes listing solutions offered by the source. The index may include metadata relating to each listed solution. The metadata may indicate the type of solution, the format of the solution, the subject matter of the solution, the specific computing device or programs that the solution applies to, etc. Accordingly, the solution identification module 122 may compare the gathered information to the metadata associated with each solution in order to identify appropriate solutions that may resolve the particular support issue faced by the user of computing device 100.

As solutions are identified, a solution index may be generated and populated by the solution aggregation engine 120. The solution index may list the identified solutions and include the metadata associated with the solutions, including the identity of the source.

The solution aggregation engine 120 may include a solution ranking module 124. The solution ranking module 124 may rank the plurality of solutions based on the information gathered by the system information engine. This ranking may be a basic relevancy ranking based on comparing the gathered information with the metadata and ordering the solutions in accordance with relevance.

The solution ranking module 124 may also rank the plurality of solutions based on other information associated with each solution of the plurality of solutions. For example, this other information may indicate a success rate of a solution based on usage data from other users. For instance, the system information engine 110, solution aggregation engine 120, and user interface 130 may be implemented on the computing devices of many users across a manufacturer's user base. Accordingly, usage data of the various solutions provided by the multiple sources may be obtained and logged to determine the effectiveness of the various solutions that are identified for a particular support issue. This information can be maintained by the solution aggregation engine 120 or by a server that supports the solution aggregation engine 120.

The other information can be tracked based on which solutions a user selects via user interface 130, how much time is spent on the solution, and/or whether a user indicates that the solution solved his problem. This information can also be tracked based on user feedback received at the solutions themselves. For example, if the user selects a solution provided at the manufacturer's website or at a website of a third party partnered with the manufacturer, information regarding the effectiveness of the solution may be provided to the solution aggregation engine 120 or to the server supporting the solution aggregation engine 120. Similarly, if a user contacts a support call center to speak with a support specialist, the support specialist may enter information into a support tool regarding the attempted solutions and the outcome. This support tool may provide this information to the solution aggregation engine 120 or to the support server. Thus, when another user searches for a solution to a similar or identical support issue, the past usage data can indicate what solutions are most likely to be effective for the user. The more effective solutions based on past usage data can be ranked higher than other solutions.

In addition, as another example, the other information may indicate a success rate of a solution based on forum data. For instance, user forums relating to a particular support issue or solution may be scanned for positive or negative user comments on the effectiveness of a particular solution. The more effective solutions based on forum data can be ranked higher than other solutions.

As mentioned previously, the plurality of solutions can be stored in an index. The index can be associated with an identifier or the like that corresponds to the user's support request. The index can be stored on computing device 100 as well as on a server supporting solution aggregation engine 120. On computing device 100, the index can be stored in a cache associated with solution aggregation engine 120. Multiple indexes corresponding to past support requests can be stored in the cache to enable the user to easily refer to past support requests and solutions. In some examples, indexes to common support issues (even if they haven't been searched yet by the user) may be stored in the cache on the computing device 100. On the server, the index can be stored and accessed by computing device 100. The index can also be stored on the server to allow the user to access the index from another device, in case the computing device 100 is not connected to the appropriate network or is not properly working. In addition, the index can be used for analytical purposes to improve ranking of solutions. In this regard, user interface 130 and/or the solution aggregation engine 120 may provide information to the server regarding usage data of the solutions by the user.

User interface 130 can present the plurality of solutions to a user of the computing device 100 in ranked order. The solutions can be presented to the user in an easily understandable manner. For example, the solutions can be organized by source, by type, or by both. In addition, the solutions can be linked so that the user can access each solution by clicking on it via the user interface 130. Where a solution is stored in a remote electronic data source, clicking on the solution can instruct computing device 100 to access the data source and request the solution. If the computing device 100 is not connected to the Internet or network on which the source resides, the solution can still be presented to the user via the user interface 130 but it can be indicated that a network connection is required to access the solution. User interface 130 can also be hosted by a server supporting the solution aggregation engine 120. Thus, for example, user interface 130 can be accessible via the Internet using a web browser or similar application.

In some examples, a user could use a web-accessible user interface similar to user interface 130 from another device to search for a solution to a support issue pertaining to computing device 100. In such a case, the solution aggregation engine 120 can be hosted by a server. The user could perform the job of the system information engine 110 by entering appropriate device information and support information via the web-accessible user interface. Additionally, the server could store a user profile containing device information regarding the user's computing device 100. In some examples, when computing device 100 is functioning properly, the solution aggregation engine 120 resident on computing device 100 can send the information gathered by the system information engine 110 to the server for storage in a user profile. Accordingly, at a later time, the device information and support information can be accessible by the user via the server even if the computing device 100 is not functioning properly.

In an embodiment, the solution aggregation engine 120 can be configured to provide an update to the user interface 130 if new solutions are discovered after identifying the plurality of solutions. For example, the solution aggregation engine 120 can update the solution index on a periodic basis and can determine whether new content has been added to a solution via the metadata associated with the solutions and the solution sources. For instance, when a solution is identified from a forum, often there may be several posts from contributors which may be marked as the solution for the forum thread. However, posts may be added to the forum after the forum is provided as a solution to the user. For example, an unanswered question or a new question (possibly one asked by the user himself) may be answered at a later time. In such a case, the solution aggregation engine 120 can notify the user via user interface 130 that a new solution may be available and provide a link to the forum.

Example processing that can be implemented by the system information engine 110, the user interface 120, and the solution aggregation engine 130, whether on computing device 100 or on a server, is described in further detail below with reference to FIGS. 2-4.

Figure 2:
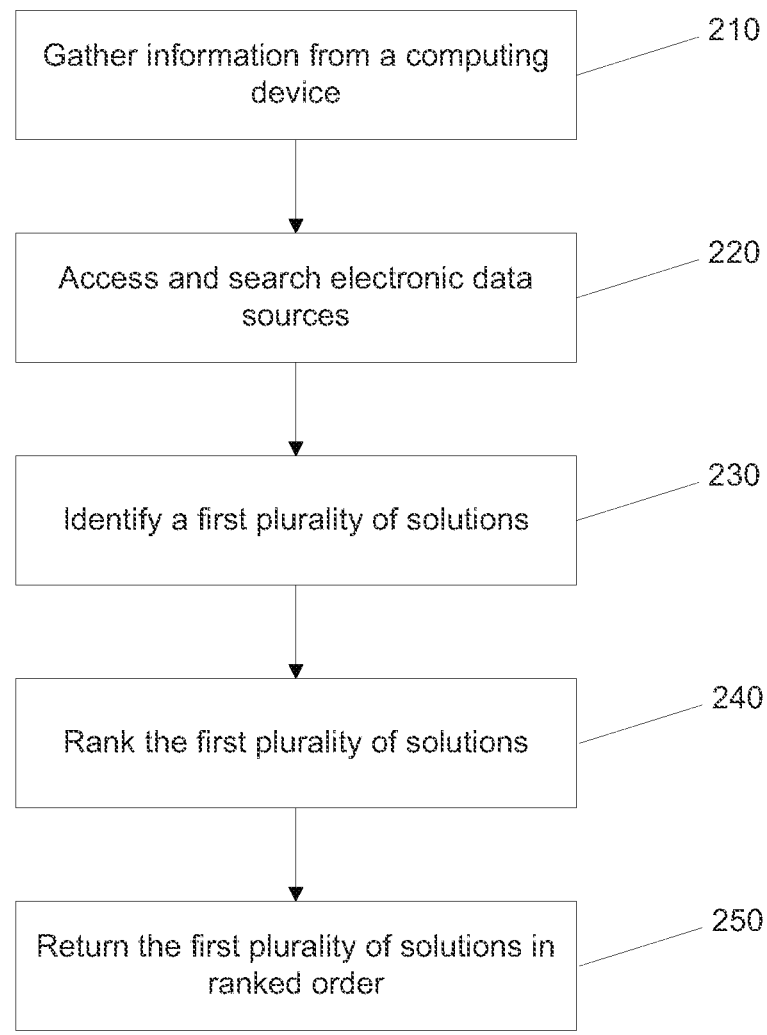
FIG. 2 is a flowchart illustrating aspects of a process for finding solutions to computer problems, according to an example.

FIG. 2 is a flowchart illustrating aspects of a method 200 that can be executed by a computing device, according to an example. Although execution of method 200 is described below with reference to the components of computing device 100, other suitable components for execution of method 200 can be used. In addition, method 200 can be executed by a server providing support to computing device 100. Method 200 may be implemented in the form of executable instructions stored on a machine-readable medium or in the form of electronic circuitry. A processor, a machine-readable storage medium, other control logic, or a combination thereof can be used to execute method 200.

Method 200 may start at 210 where information can be gathered from a computing device. The information can include device information and support information regarding a support issue associated with the computing device. For example, the system information engine 110 of computing device 100 can gather device information and support information. At 220, method 200 can access multiple electronic data sources to search for a solution to the support issue. Each electronic data source can include multiple solutions. At 230, a plurality of solutions can be identified from the multiple electronic data sources based on the gathered information. The solution identification module 122 of solution aggregation engine 120 can perform 220 and 230.

At 240, the plurality of solutions can be ranked. The plurality of solutions can be ranked based on the gathered information and based on at least one of feedback associated with the plurality of solutions and data analytics associated with the plurality of solutions. The solution ranking module 124 of solution aggregation engine 120 can perform 240. In an example, the feedback can be user feedback on one or more solutions posted in user forums or provided to the solution aggregation engine 120 via user interface 130. At 250, the plurality of solutions can be returned in ranked order. For example, if method 200 was being executed on a server, the plurality of solutions could be returned to the computing device 100. If method 200 was being executed on computing device 100, the plurality of solutions could be returned to user interface 130.

Figure 3:
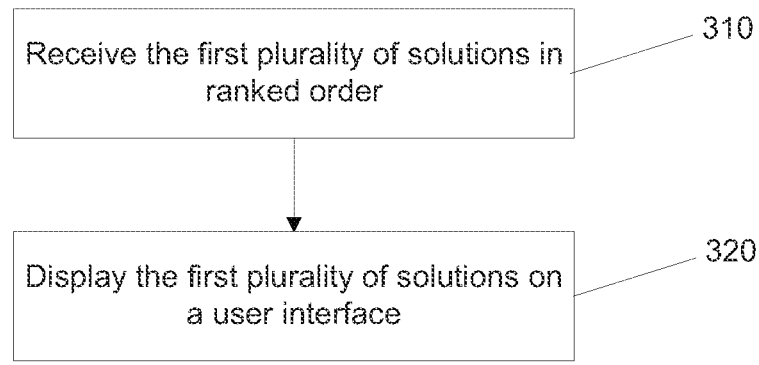
FIG. 3 is a flowchart illustrating aspects of a process for displaying solutions via a user interface, according to an example.

FIG. 3 is a flowchart illustrating aspects of a method 300 that can be executed by a computing device, according to an example. Although execution of method 300 is described below with reference to the components of computing device 100, other suitable components for execution of method 300 can be used. Method 300 may be implemented in the form of executable instructions stored on a machine-readable medium or in the form of electronic circuitry. A processor, a machine-readable storage medium, other control logic, or a combination thereof can be used to execute method 300.

Method 300 may start at 310 where the plurality of solutions can be received in ranked order. The solutions can be received from software running on computing device 100 or from a server. For example, the solutions can be received from the solution aggregation engine 120. At 320, the solutions can be displayed on a user interface. For example, the solutions can be displayed via user interface 130. The solutions can be presented in a manner so that they are easily understood and accessible to a user. For example, the solutions can be grouped according to the electronic data source from which each solution came, according to type of solution, or both.

In one example, a user may be having trouble with a software application, such as an internet browser (e.g., Internet Explorer®). For instance, perhaps the user is having trouble opening a particular type of document (e.g., a pdf document) within the internet browser. The user may access user interface 130 to search for a solution to the problem. Accessing user interface 130 may include opening a separate application from the operating system's start menu, for example, or clicking on a help or support button which may be embedded within the application the user is using (e.g., the internet browser). The user may type a question in a query box of user interface 130, such as, "How to open pdf documents within Internet Explorer?". System information engine 110 may also gather system information and other support information from the user's computing device. The user's query along with the system and support information may be provided to the solution aggregation engine 120.

The solution aggregation engine 120 may then search multiple electronic data sources for solutions to the support issue by comparing the system and support information to metadata associated with solutions in the sources. The sources may also be searched based on relevancy using the system and support information as keywords. As examples, the solution aggregation engine 120 could search a support website or database provided by the providers of the internet browser (e.g., Microsoft® for Internet Explorer®) and the document type (e.g., Adobe® for pdf documents). Additionally, the solution aggregation engine 120 could search support resources provided on the computing device itself or provided at a website or database hosted by the computing device manufacturer (e.g., HP®). Multiple solutions may be found and ranked based on relevancy and data analytics. The ranked list of solutions may be returned and displayed to the user via user interface 130. For instance, the solutions may be displayed by source (e.g., Microsoft® solutions, Adobe® solutions, HP® solutions) and type (e.g., documents, videos, tutorials). The user may then select a solution by clicking on it and the selected solution may be provided to the user.

Figure 4:
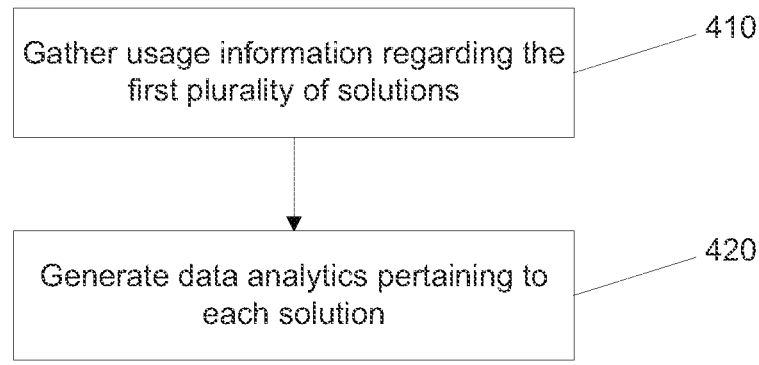
FIG. 4 is a flowchart illustrating aspects of a process for generating data analytics relating to potential solutions, according to an example.

FIG. 4 is a flowchart illustrating aspects of a method 400 that can be executed by a computing device, according to an example. Although execution of method 400 is described below with reference to the components of computing device 100, other suitable components for execution of method 400 can be used. Method 400 may be implemented in the form of executable instructions stored on a machine-readable medium or in the form of electronic circuitry. A processor, a machine-readable storage medium, other control logic, or a combination thereof can be used to execute method 400.

Method 400 may start at 410 where usage information regarding the plurality of solutions can be gathered. For example, usage information can be gathered from computing device 100, such as from user interface 130, regarding which of the plurality of solutions is selected by a user of the computing device. At 420, method 400 may generate data analytics associated with each of the selected plurality of solutions to reflect the usage information. Generating data analytics may include creating new data analytics or updating pre-existing data analytics. Accordingly, successful solutions can be identified based on the usage information and can be ranked higher in later solution sets. Usage information can be stored on a server in a database. The database can then be accessed when ranking a solution set.

Figure 5:
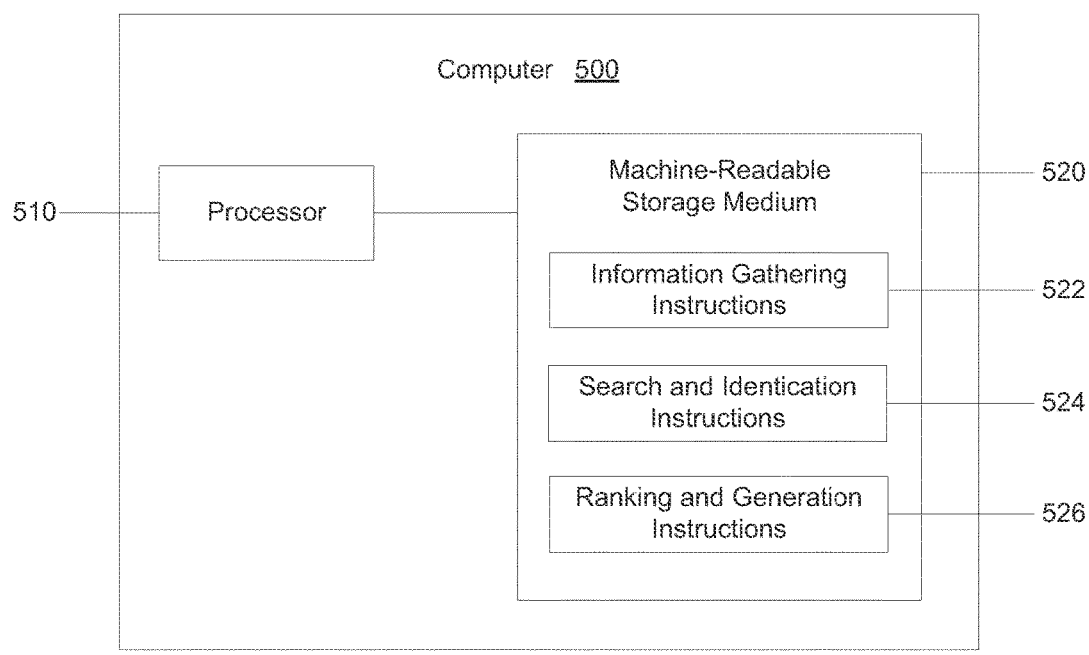
FIG. 5 is a block diagram illustrating a computer including a machine-readable storage medium encoded with instructions for finding solutions to computer problems, according to an example.

FIG. 5 is a block diagram illustrating aspects of a computer 500 including a machine-readable storage medium 520 encoded with instructions, according to an example. Computer 500 may be any of a variety of computing devices, such as a laptop computer, a workstation computer, a desktop computer, a tablet or slate computer, or a smart phone, among others.

Processor 510 may be at least one central processing unit (CPU), at least one semiconductor-based microprocessor, at least one digital signal processor (DSP) such as a digital image processing unit, other hardware devices or processing elements suitable to retrieve and execute instructions stored in machine-readable storage medium 520, or combinations thereof. Processor 510 can include single or multiple cores on a chip, multiple cores across multiple chips, multiple cores across multiple devices, or combinations thereof. Processor 510 may fetch, decode, and execute instructions 522, 524, 526, among others, to implement various processing. As an alternative or in addition to retrieving and executing instructions, processor 510 may include at least one integrated circuit (IC), other control logic, other electronic circuits, or combinations thereof that include a number of electronic components for performing the functionality of instructions 522, 524, 526. Accordingly, processor 510 may be implemented across multiple processing units and instructions 522, 524, 526 may be implemented by different processing units in different areas of computer 500.

Machine-readable storage medium 520 may be any electronic, magnetic, optical, or other physical storage device that contains or stores executable instructions. Thus, the machine-readable storage medium may comprise, for example, various Random Access Memory (RAM), Read Only Memory (ROM), flash memory, and combinations thereof. For example, the machine-readable medium may include a Non-Volatile Random Access Memory (NVRAM), an Electrically Erasable Programmable Read-Only Memory (EEPROM), a storage drive, a NAND flash memory, and the like. Further, the machine-readable storage medium 520 can be computer-readable and non-transitory. Machine-readable storage medium 520 may be encoded with a series of executable instructions for gathering information from a computing device, searching multiple data sources for solutions to a support issue, and ranking the solutions to generate a list of solutions ranked according to relevancy.

The instructions 522, 524, 526, when executed by processor 510 (e.g., via one processing element or multiple processing elements of the processor) can cause processor 510 to perform processes, for example, the processes depicted in FIGS. 2-4. Furthermore, computer 500 may be similar to computing device 100 or to a server supporting computing device 100 and may have similar functionality and be used in similar ways, as described above.

Information gathering instructions 522 can cause processor 510 to gather information from a computer. If computer 500 is a server computer providing support to a user computer, processor 510 can gather the information from the user computer itself, from a profile of the user computer stored on the server, or from the user via a web-accessible user interface. If computer 500 is the user computer, processor 510 can gather the information from the computer itself. The information can include system information and support information regarding a support issue with the computer. The system information can be similar to the device information described with respect to computing device 100. Computer 500 can implement the information gathering instructions 522 similar to the system information engine 110 of computing device 100.

The search and identification instructions 524 can cause processor 510 to search multiple electronic data sources for a solution to the support issue. Each electronic data source can include multiple solutions. The instructions can further cause processor 510 to identify a plurality of solutions from the multiple electronic data sources based on the gathered information. Computer 500 can implement the search and identification instructions 524 similar to the solution identification module 122 of computing device 100's solution aggregation engine 120.

The ranking and generation instructions 526 can cause processor 510 to rank the plurality of solutions. The solutions can be ranked based on the gathered information. The solutions can also be ranked based on at least one of feedback associated with the plurality of solutions and data analytics associated with the plurality of solutions. The instructions can further cause processor 510 to generate a list of the plurality of solutions according to rank. Computer 500 can implement the ranking and generation instructions 526 similar to the solution ranking module 124 of computing device 100's solution aggregation engine 120.

The list of solutions can be provided to a user for resolution of the support issue. If computer 500 is a server computing providing support to a user computer, the list of solutions can be provided to the user computer for presentation to the user via a user interface, such as user interface 130.

What is claimed is:

1. A computing, device, comprising:
a processor;
a non-transitory storage medium storing instructions executable on the processor to:
receive a query relating to an error event associated with the computing device;
gather information regarding a model of the computing device, a current status of the computing device, and the error event associated with the computing device;
in response to the query, identify a plurality of solutions based on searching a plurality of different remote electronic data sources over a network, the searching comprising comparing the gathered information regarding the model, the current status, and the error event to metadata stored by the plurality of different remote electronic data sources; and
rank the plurality of solutions based on the gathered information and other information associated with each respective solution of the plurality of solutions that indicates a success rate of the respective solution, wherein the other information comprises an amount of time spent on the respective solution, and the ranking is based on the amount of time spent on the respective solution; and
a user interface to present the plurality of solutions in ranked order according to the ranking.

2. The computing, device of claim 1, wherein the instructions are executable on the processor to compare the gathered information to the metadata stored in an index associated with each remote electronic data source to identify the plurality of solutions.

3. The computing device of claim 1, wherein the other information associated with each respective solution of the plurality of solutions that indicates the success rate of the respective solution comprises forum data from a forum website including user comments on the respective solution, and analysis data regarding the success rate of the respective solution based on past usage of the respective solution.

4. The computing device of claim 3, wherein the instructions are executable on the processor to update the user interface in response to discovering a new solution after identifying the plurality of solutions.

5. The computing device of claim 1, wherein the instructions are executable on the processor to send the gathered information to a server for remote storage of the gathered information.

6. The computing device of claim 1, wherein the plurality of different remote electronic data sources searched over the network in response to the query comprises a website of a manufacturer of the computing device, and a forum website at which users post comments regarding problems and solutions to the problems.

7. A method comprising:
receiving a query relating to a support issue of a computing device;
gathering information from the computing device, the gathered information comprising device information regarding a model of the computing device, and support information regarding the support issue of the computing device;
in response to the query, searching, over a network, multiple different remote electronic data sources for a solution to the support issue, each remote electronic data source of the multiple different remote electronic data sources storing information of multiple potential solutions;
identifying a plurality of solutions from the multiple different remote electronic data sources based on the searching that comprises comparing the gathered information comprising the device information regarding the model, and the support information regarding the support issue, to metadata stored by the multiple different remote electronic data sources;
ranking the plurality of solutions based on the gathered information and based on user feedback associated with the plurality of solutions, wherein the user feedback comprises an amount of time spent on each respective solution of the plurality of solutions, and the ranking is based on the amount of time spent on the respective solution; and
returning the plurality of solutions to the computing device according to ranking.

8. The method of claim 7, wherein the query is responsive to input entered by a user via a user interface.

9. The method of claim 7, wherein the support information comprises an error event logged in an error log of the computing device.

10. The method of claim 7, further comprising:
gathering usage information from the computing device regarding which of the plurality of solutions is selected by a user of the computing device; and
generating, data analytics associated with each selected solution based on the usage information.

11. The method of claim 7, wherein the method is performed on a server computer remote from the computing device.

12. The method of claim 7, wherein the method is performed on the computing device.

13. The method of claim 7, further comprising presenting the plurality of solutions via a user interface, the user interface displaying each respective solution of the plurality of solutions grouped according to the electronic data source from which the respective solution is received.

14. The method of claim 7, wherein the multiple different remote electronic data sources searched over the network in response to the query comprises a website of a manufacturer of the computing device, and a website of a provider of a software of the computing device.

15. The method of claim 14, wherein the multiple different remote electronic data sources searched over the network in response to the query further comprises a forum website at which users post comments regarding support issues and solutions to the support issues.

16. A non-transitory machine-readable storage medium encoded with instructions that upon execution cause a system to:
receive a query relating to a support issue associated with a computer;
gather information from the computer, the gathered information comprising system information regarding a model of the computer, and support information regarding the support issue associated with the computer;
in response to the query, search, over a network, multiple different electronic data sources for a solution to the support issue, each remote electronic data source storing information of multiple potential solutions;
identify a plurality of solutions from the multiple different electronic data sources based on the searching that comprises comparing the gathered information comprising the system information regarding the model, and the support information regarding the support issue, to metadata stored by the multiple different electronic data sources;
rank the plurality of solutions based on the gathered information and based on feedback associated with the plurality of solutions, wherein the feedback comprises an amount of time spent on each respective solution of the plurality of solutions, and the ranking is based on the amount of time spent on the respective solution; and
generate a list of the plurality of solutions according to ranking.

17. The computing device of claim 6, wherein the plurality of different remote electronic data sources searched over the network in response to the query further comprises a website of a provider of a software of the computing device.

18. The non-transitory machine-readable storage medium of claim 16, wherein the multiple different electronic data sources searched over the network in response to the query comprises a website of a manufacturer of the computing device, a website of a provider of a software of the computing device, and a forum website at which users post comments regarding support issues and solutions to the support issues.

* * * * *

UNITED STATES PATENT AND TRADEMARK OFFICE
CERTIFICATE OF CORRECTION

PATENT NO.        : 9,672,252 B2
APPLICATION NO.   : 14/371514
DATED             : June 6, 2017
INVENTOR(S)       : John A. Landry et al.

It is certified that error appears in the above-identified patent and that said Letters Patent is hereby corrected as shown below:

In the Claims

In Column 9, Line 32, in Claim 1, delete "computing," and insert -- computing --, therefor.

In Column 9, Line 58, in Claim 2, delete "computing," and insert -- computing --, therefor.

In Column 10, Line 56, in Claim 10, delete "generating," and insert -- generating --, therefor.

Signed and Sealed this
Twelfth Day of September, 2017

Joseph Matal
*Performing the Functions and Duties of the*
*Under Secretary of Commerce for Intellectual Property and*
*Director of the United States Patent and Trademark Office*